United States Patent
Noguchi et al.

(10) Patent No.: US 7,061,508 B1
(45) Date of Patent: Jun. 13, 2006

(54) LOADING PATTERN GENERATING METHOD

(75) Inventors: Yasuhiko Noguchi, Kitakyushu (JP); Koichi Kuwahara, Kitakyushu (JP); Ayumi Koga, Kitakyushu (JP); Keishi Akiba, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/530,107

(22) PCT Filed: Oct. 23, 1998

(86) PCT No.: PCT/JP98/04827

§ 371 (c)(1),
(2), (4) Date: Jul. 3, 2000

(87) PCT Pub. No.: WO99/21784

PCT Pub. Date: May 6, 1999

(30) Foreign Application Priority Data

Oct. 27, 1997 (JP) .............................. 9-311285

(51) Int. Cl.
*G09G 5/00* (2006.01)

(52) U.S. Cl. ..................................... 345/619
(58) Field of Classification Search ................. 345/619, 345/440; 700/214–217
See application file for complete search history.

(56) References Cited

U.S. PATENT DOCUMENTS

| 4,641,271 | A |   | 2/1987  | Konishi et al.          |
|-----------|---|---|---------|--------------------------|
| 5,844,807 | A | * | 12/1998 | Anderson ........... 700/217 |
| 5,889,523 | A | * | 3/1999  | Wilcox et al. ....... 345/854 |
| 5,984,503 | A | * | 11/1999 | Strickland et al. ... 700/95 |
| 5,997,169 | A | * | 12/1999 | Watanabe et al. .... 700/83 |
| 6,055,462 | A | * | 4/2000  | Sato ................ 700/217 |
| 6,425,226 | B1| * | 7/2002  | Kirschner ........... 53/445 |

FOREIGN PATENT DOCUMENTS

| JP | 60209439  | 10/1985 |
| JP | 06-243209 | 9/1994  |
| JP | 6243209   | 9/1994  |

* cited by examiner

Primary Examiner—Jeffery Briar
Assistant Examiner—Motilewa Good-Johnson
(74) Attorney, Agent, or Firm—Westerman, Hattori, Daniels & Adrian, LLP

(57) ABSTRACT

A method of loading a pallet that begins by showing a plan view of the pallet on a display screen. The direction and patterns of articles to be placed on the pallet are shown in the plan view. The pattern of articles is then moved to a selected position in the plan view of the display screen. The layout of articles is determined by changing the direction of the pattern to a selected direction. Using this method, positioning of goods on a pallet is done on the basis of the pallet and previously loaded articles. Once the pattern of articles has been determined, the given tier of the pallet is generated.

8 Claims, 5 Drawing Sheets

(a)

(b)

(c)

(a)

(b)

(c)

(d)

(a)

(b)

(c)

(a)

(b)

(c)

(PRIOR ART)

LOADING PATTERN GENERATING METHOD

TECHNICAL FIELD

The present invention relates to a method for preparing loading patterns, and in particular a method for preparing loading patterns in order to palletize goods by a robot.

BACKGROUND OF THE INVENTION

Recently, automation of loading and placing of goods on a pallet, that is, palletizing work, by using a robot has been frequently carried out. Originally, it was necessary to teach such a robot a series of work processes using an actual machine, that is, to cause the robot to hold goods, to actually load the goods on a real pallet, and prepare robot operation programs. However, the teaching using an actual machine took plenty of time and was cumbersome. Therefore, off-line teaching has prevailed, in which the operations of a robot are simulated on a computer to prepare robot operation programs.

Conventionally, in the off-line teaching of palletizing work made by a robot, many of parameters have been numerically inputted for respective goods, wherein the parameters correspond to position and direction (orientation), that is, at which part and in which direction goods are placed on a pallet.

Herein, based on FIG. 5, a description is given of a prior art technology. FIG. 5 is a plan view of a loading pattern.

In the prior art method, first, it was necessary that a plan view shown in FIG. 5 is prepared on sheets of paper. In the same drawing, 31 indicates a rectangular area whose length is L and width is L+2W and corresponds to a plan of a pallet. 32, 33 and 34 indicate a rectangle whose length is L and width is W, which correspond to a plan of goods to be loaded and placed on the corresponding pallet. The drawing shows that, first, goods corresponding to the rectangle 32 are placed on the corresponding pallet, goods corresponding to the rectangles 33 and 34 are placed thereon, thereby making a loading pattern formation to become H-shaped. Arrow 38 is a symbol indicating the directions of the rectangles 32, 33 and 34, wherein the arrow indicates the escape direction of a gripper claw of a hand which grasps the goods. That is, if previously placed goods exists in the direction of the arrow 38, the gripper claw is caused to interfere with the above goods. Thus, in order to determine a loading pattern, it is necessary to take care of the placing sequence and the direction of goods. After the loading pattern is determined on sheets of paper, it was necessary for an operator to code the loading pattern in the form of numerical data that can be read by the off-line teaching programs. The numerical data describe the pallet size and goods size in an appointed form, and describe the position and direction of the goods for each of the goods in the sequence of loading. An operator manually coded while reading the data from the previously prepared loading patterns.

However, in the prior arts, since data was manually coded on the basis of the abovementioned loading patterns after the loading patterns were manually prepared on sheets of paper, the work was very cumbersome. Also, since rules regarding construction and description of data are very complicated in coding the data, there was another problem, that is, that plenty of time was required for an operator to be acquainted with the coding work. In addition, still another problem arose in that, if there is an error in coding, the error cannot be easily found unless the data are read by the off-line teaching programs and the corresponding simulation is carried out.

DISCLOSURE OF THE INVENTION

It is therefore an object of the invention to provide a method for easily preparing loading patterns while performing simulations of sequentially placing patterns on the loading areas on the display screen of a computer.

In order to overcome the shortcomings and problems, according to the invention, an area indicating a plan of a pallet is displayed on the display screen of a computer, and patterns showing the plan and direction of goods are displayed at a separate place from the abovementioned area of the above display screen, wherein the patterns are moved to appointed positions in the abovementioned area on the display screen, and loading patterns of goods on the pallet can be prepared by changing the orientation (direction) to an appointed direction and determining the layout in the area of the pattern.

BEST MODE FOR CARRYING OUT THE INVENTION

Hereinafter, a description is given of preferred embodiments of the invention with reference to the accompanying drawings. FIG. 1(a) is a configurational view of a personal computer that prepares loading patterns, FIG. 1(b) is a flow chart, and FIG. 1(c) is a view showing a display on the screen.

Figure 1:
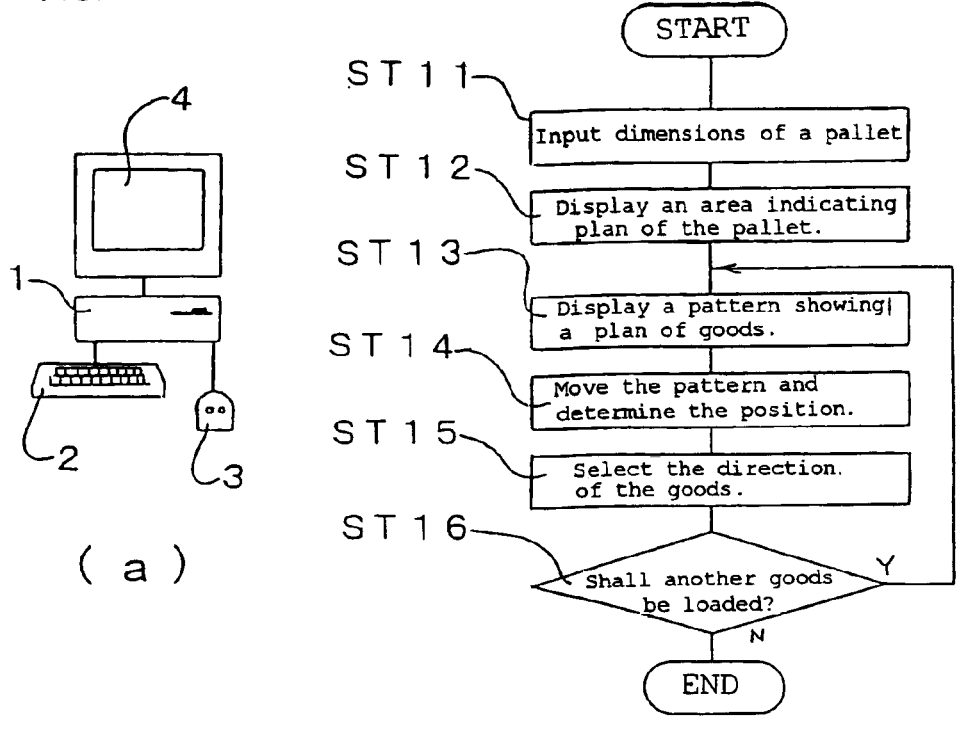
FIG. 1 is an explanatory view of a first preferred embodiment of the invention, wherein (a) is a configurational view of a personal computer, (b) is a flow chart, and (c) is a view indicating a display screen displayed by the personal computer.
Figure 1:
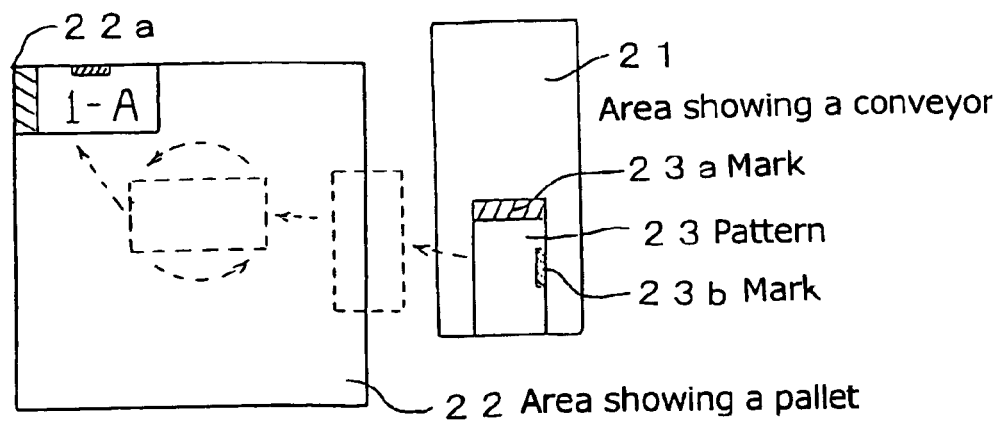

In FIG. 1(a), 1 indicates a personal computer body to which a keyboard 2, a mouse 3, and a display 4 are connected. And the mouse 3 is provided with two left and right buttons.

In FIG. 1(b), step ST11 is a process for inputting dimensions of a pallet and goods to be loaded on the pallet into a personal computer via a keyboard 2. Step ST12 is a process for displaying an area indicating a plan of the pallet on a display 4. Step ST13 is a process for displaying a pattern indicating the plan of goods on the display 4. Step ST14 is a process for an operator to move the pattern to an appointed position on the area and to determine the position to load the goods on the pallet. Step ST15 is a process for an operator to select the direction of the goods when the goods are placed on the pallet. Step ST16 is a process for judging whether or not goods are continuously loaded, wherein steps ST13 through ST16 are repeated until an appointed number of patterns have been allotted to the area.

Again, a description is given of the above flow with reference to the screens displayed on the display 4. In FIG. 1(c), 21 is an area showing a conveyor, 22 indicates an area showing a pallet, and 23 is a pattern showing the plan of goods. The correlation among the areas 21, 22 and pattern 23 and a robot (not illustrated) is determined in advance in accordance with the arrangement of an actual machine. At the stage where step ST13 is completed, the areas 21 and 22 and a pattern 23 are thus displayed on the screen of the display 4. Herein, 23a is a mark showing the escape direction of a gripper claw which grasps goods, in an actual machine, 23b is another mark showing a label-adhering surface on the goods. In the same drawing, the gripper claw of a hand escapes upward in the drawing, and a label is adhered to the right side of the goods.

An operator operates a mouse 3 while looking at the screen display to move a mouse pointer (not illustrated) to the pattern 23, and presses the left side button of the mouse 3 to designate the pattern 23, and the operator further moves the mouse 3 to move the pattern 23 to the area 22. In the process of moving the pattern, pressing the right side button of the mouse 3 causes the direction of the pattern 23 to change by a fixed angle. Releasing the left side button of the mouse 3 after moving the pattern 23 to the left shoulder 22a of the area 22 determines the left shoulder corner of the pattern 23, adapting itself to the left shoulder 22a of the area 22, wherein characters "1-A" are displayed inside the pattern 23. These are the goods to be load at the first loading, and indicates that positioning has been carried out in a coordinate system where the left shoulder 22a of the pallet is used as the original point. In addition, the original point for positioning the pattern 23 on the basis of the area 22 indicating the pallet is not limited to the left shoulder 22a. It may be selected from any of the four corners. When goods to be loaded for the first time are positioned in the coordinate system where the corner point at the right shoulder, right underside, or left underside of the pallet, the abovementioned indication will become "1-B", "1-C", or "1-D". That is, it is possible to load goods from any point of the four corners of the pallet. It is needless to say that goods can be loaded from the middle of the pallet.

Since a new patter 23 is displayed in area 21 after the pattern 23 is positioned, the above operation is repeated until an appointed number of patterns 23 are placed in the area 22.

It is important that, when preparing a loading pattern of goods, an operator seeks the loading pattern by which the number of goods to be loaded on a pallet is maximized, and loaded and piled goods does not fall down. However, it is necessary to taken other conditions than these into consideration in actual palletizing work. For example, there are important points such as an escape direction of a gripper claw of a hand, the direction for adhering a label, etc. In the preferred embodiment, the operator selects the direction of the pattern 23 so that the gripper claw of the hand does not interfere with the previously loaded goods while paying attention to the mark 23a, and selects the direction of the pattern 23 so that, when the goods are piled and loaded, labels adhered to the sides thereof can be seen from the outside while paying attention to the mark 23b. Thus, since information regarding the direction of goods to be loaded is displayed on the pattern 23, the operator can prepare loading patterns while visually checking the direction of the goods.

Further, since information regarding the relative positions among a conveyor, a robot and a pallet, dimensions of goods, and dimension of the pallet is stored in a computer in the form of variables, the operation programs of the robot can be altered by changing only the variables where the positional relationship, dimensions of the goods, etc., are changed.

Figure 2:
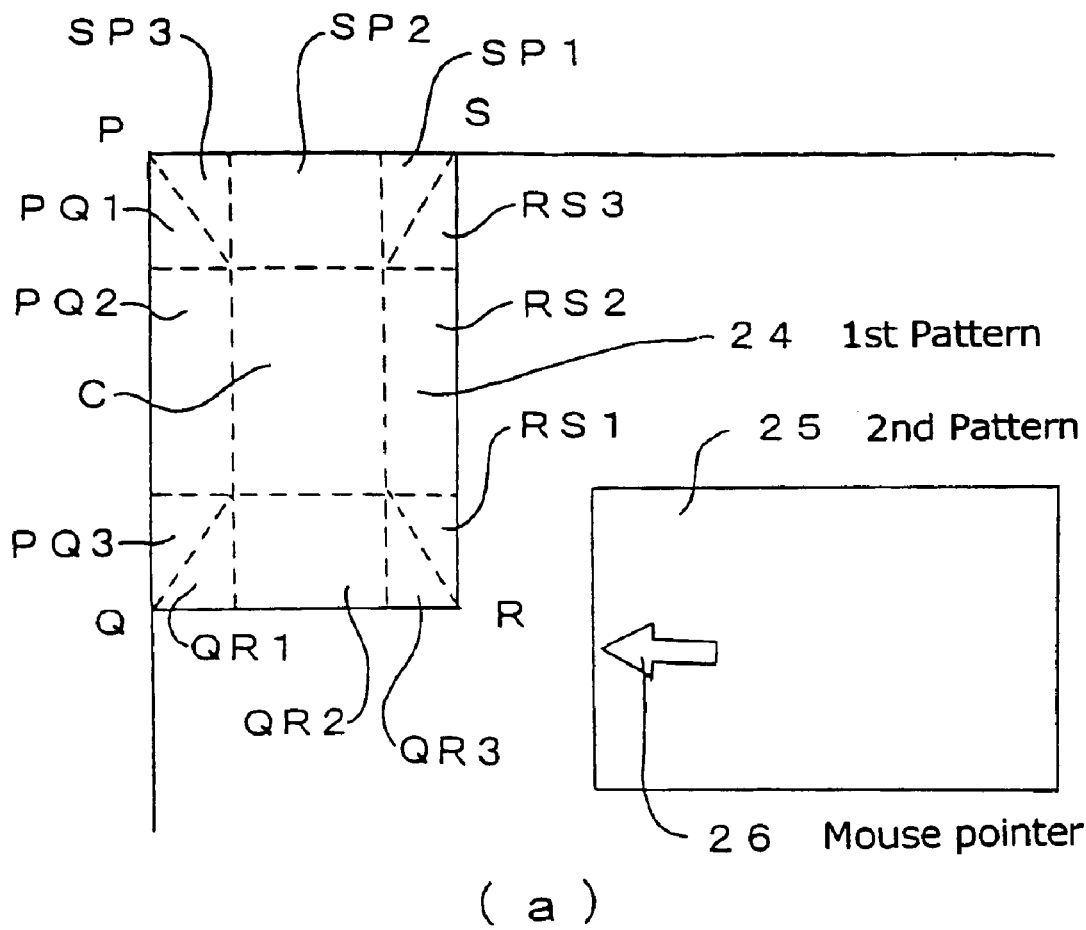
FIG. 2 is an explanatory view of a second preferred embodiment, wherein (a) is a view showing the display screen before an operation, (b), (c), and (d) are views showing the display screens after the operation.
Figure 2:
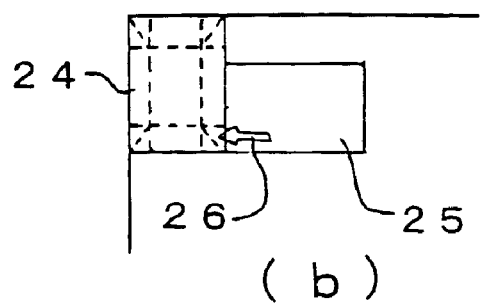
Figure 2:
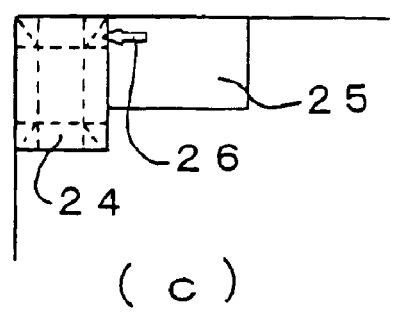
Figure 2:
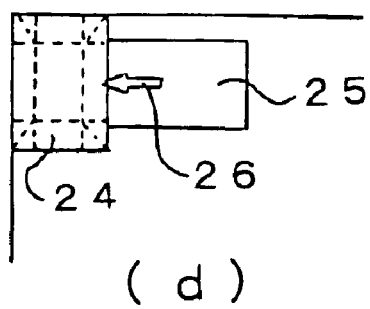

FIG. 2 is an explanatory view showing a second preferred embodiment of the invention.

In FIG. 2(a), 24 indicates the first pattern whose position and direction have already been determined. 25 is the second pattern whose layout is to be determined following the pattern 24. 26 is a mouse pointer indicating the position, on the display, pointed out by the mouse 3. P, Q, R and S are four top points of the pattern 24. The pattern 24 is divided into twelve positioning areas that are PQ1, PQ2, PQ3, QR1, QR2, QR3, RS1, RS2, RS3, SP1, SP2 and SP3, and the middle point C.

For example, an operator operates as follows when he attempts to arrange the second pattern 25 so as to be brought into contact with side RS of the pattern 24.

First, operating the mouse 3, the mouse pointer 26 is moved to the position pointing out the second pattern 25 on the display screen, and the second pattern 25 is designated by pressing the left side button of the mouse 3, Next, the second pattern 25 is oriented to an appointed direction by pressing the right side button of the mouse 3. Next, the second pattern 25 is moved to the first pattern 24 by moving the mouse 3 with the left side button of the mouse 3 pressed. Also, the mouse pointer 26 is moved to a positioning area RS1, RS2 or RS3. If the mouse pointer 26 is placed on the positioning area RS1, the second pattern 26 is brought into close contact with the side RS on the basis of the top point R as shown in FIG. 2(b). Further, if the mouse pointer 26 is placed on the positioning area RS3, the second pattern 25 is brought into close contact with the side RS on the basis of the top point S as shown in FIG. 2(c). Further, if the mouse pointer 26 is placed on the positioning area RS2, the second pattern 25 is brought into close contact with the side RS on the basis of the middle point of the side RS as shown in FIG. 2 (d) . Thus, by releasing the left side button of the mouse 3 after matching the mouse pointer 26 to the positioning area at which the second pattern 25 is placed at an appointed position, the layout of the second pattern 25 is determined. Where it is desired that the second pattern 25 is brought into close contact with the first pattern 24 at the side QR, the mouse pointer 26 may be moved to the positioning area QR1, QR2 or QR3. This is the same as for the sides PQ and SP. In addition, no action is carried out when the mouse pointer 26 is aligned with the middle position C.

Although illustration is omitted, as in the first preferred embodiment, "1-A" is displayed on the first pattern 24, and "2-1" is displayed on the second pattern. The "2-1" indicates goods to be loaded at the second loading, which also indicates that the goods has been positioned in a coordinate system on the basis of the goods loaded at the first loading. Thus, the loading sequence of goods and coordinate systems which will becomes the basis of positioning are displayed on patterns.

Figure 3:
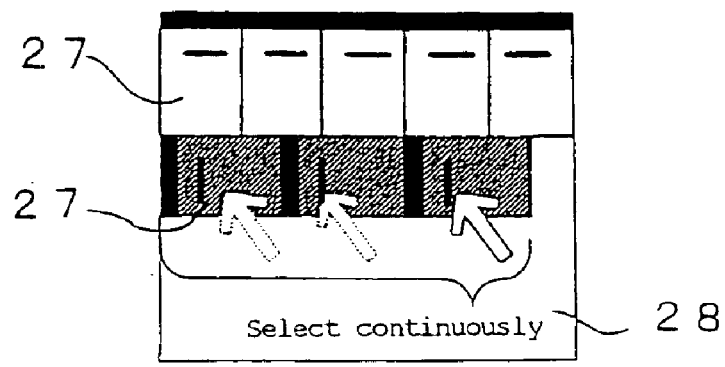
FIG. 3 is an explanatory view of a third preferred embodiment of the invention, wherein (a) is a view showing the display screen before an operation, (b) and (c) are views showing the display screens after the operation.
Figure 3:
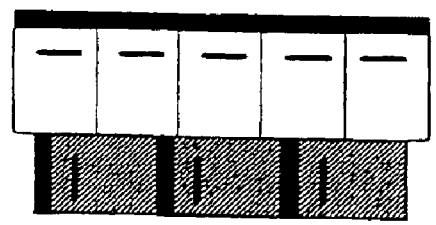
Figure 3:
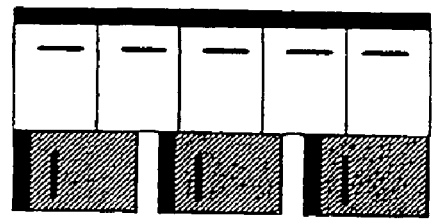

FIG. 3 is an explanatory view of a third preferred embodiment. Pattern 27 is disposed in the area 28. Herein, as shown in FIG. 3(a), three patterns 27 placed in a series are continuously selected. Next, if centering is selected, the three patterns 27 are collected at the center of area 28 as shown in FIG. 3(b). If an equidistant layout is selected, the three patterns 27 are placed in a row equidistantly between the left and right boundaries of the area 28 as shown in FIG. 3(c). The centering and equidistant layout are selected by clicking the menu on the display screen (not illustrated), or they may be inputted through keyboard 2.

Figure 4:
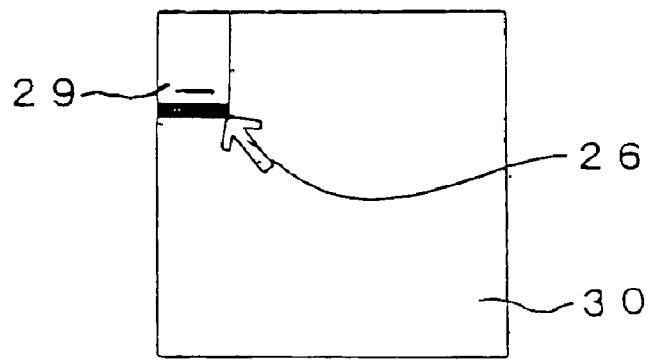
FIG. 4 is an explanatory view of a fourth preferred embodiment, wherein (a) is a view showing the display screen before an operation, (b) is a view showing the display screen in the process for the operation, and (c) is a view showing the display screen after the operation.
Figure 4:
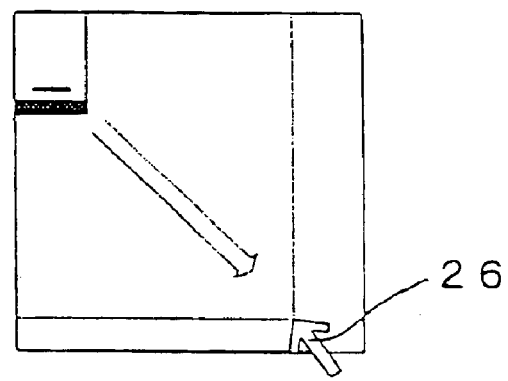
Figure 5:
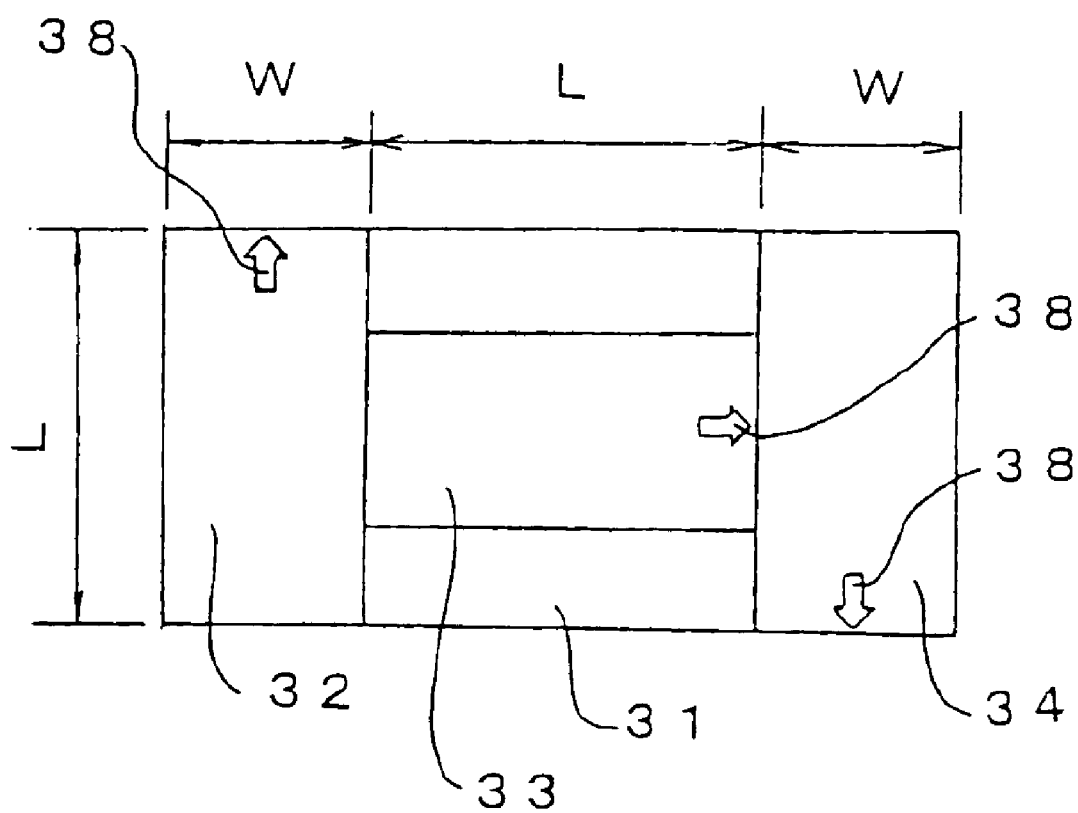
FIG. 5 is a plan view of a prior art loading pattern.

FIG. 4 is an explanatory view of a fourth preferred embodiment. In FIG. 4(a), 29 indicates a pattern disposed in area 30. Herein, as shown in FIG. 4(b), the pattern 29 is selected, and the mouse pointer 26 is dragged in the diagonal direction as it is, whereby patterns 29 are placed longitudinally and latitudinally, as shown in FIG. 4(*c*), so that the patterns 29 are spread all over a rectangular area defined by a diagonal line corresponding to a linear segment connecting the points designated by the pattern 29 and the mouse pointer 26.

As described above, the invention has the following effects;

(1) Since loading patterns are prepared while checking the directions of goods to be loaded, on the display screen of a computer, it is possible to prepare loading patterns without any error in a short time.

(2) Since positioning can be carried out by selecting either positioning on the basis of a pallet or positioning on the basis of the previously loaded goods, efficiency of preparing loading patterns is high.

(3) Since a sequence of loading on a pallet and a coordinate system which becomes the basis of positioning are displayed on patterns, it is very easy to check the loading sequence and to change the loading patterns.

(4) Since no special knowledge is required for description of data of off-line teaching programs, the operation is easy and simple.

(5) Since mutual positions of apparatuses such as a conveyor, a robot and pallets, and dimensions, etc., of goods and pallets are stored in a computer as variable parameters, operation programs of the robot can be altered by only inputting the figures of changed variable parameters even though the layout of the apparatuses, and dimensions of goods and pallets are changed.

Industrial Applicability

The invention is very effective for a method for preparing loading patterns, and in particular a method for preparing loading patterns to palletize goods by using a robot.

What is claimed is:

1. A loading pattern generating method, based on which goods are loaded on a pallet by turns, on the display screen of a computer, comprising the steps of:

displaying an area indicating a plan view of the pallet on said display screen;

displaying a pattern, which represents said goods, by indicating a plan view and a direction thereof at a position separate from said area of said display screen, said direction being compared with that of another of the goods to be loaded on the pallet;

moving said pattern to an appointed position in said area on said display screen; and determining a layout in said area of said pattern by changing the direction of said pattern to an appointed direction, wherein positioning said goods on the pallet is done by placing figures one by one at a time on a computer screen and positioning said goods is based upon the pallet used and on the direction that previously loaded goods were positioned; whereby loading patterns of goods on said pallet are prepared.

2. A loading pattern generating method as set forth in claim 1, wherein the position and direction of said pattern are determined on the basis of said area.

3. A loading pattern generating method as set forth in claim 1 or 2, wherein the position and direction of a second pattern to be subsequently disposed are determined on the basis of the first pattern previously disposed.

4. A loading pattern generating method as set forth in claim 3, wherein said second pattern is disposed, by designating the vicinity of an end portion of a side of the previously disposed first pattern, so that the side of the second pattern to be subsequently loaded overlaps the side of said first pattern with the end portions thereof trued up with each other, and the middle point of a side of said second pattern is made coincident with the middle point of a side of said first pattern by designating the vicinity of the middle point of a side of said first pattern, and said second pattern is disposed so that the side of said pattern overlaps the side of said first pattern.

5. A loading pattern generating method as set forth in claim 1, wherein a plurality of patterns are automatically rearranged so as to be equidistantly disposed from one end to the other end of said area by pointing out said plurality of designated patterns disposed in a series in said area.

6. A loading pattern generating method as set forth in claim 1, wherein a plurality of patterns are automatically re-arranged so as to be collected in close contact at the middle of said area by pointing out said plurality of designated patterns disposed in a series in said area.

7. A loading pattern generating method as set forth in claim 1, wherein said patterns are disposed longitudinally and latitudinally so that said patterns are spread all over in rectangular area defined by a diagonal line pointed out by selecting one of said patterns disposed in said area and separately selecting the top point of one opposite angle with the top point of said pattern made as the other opposite angle.

8. A loading pattern generating method as set forth in any one of the claims 1, 2 and 5 through 7 wherein a coordinate system, which is the basis to determine a loading sequence, position and direction, is displayed on said pattern.

* * * * *